United States Patent
Kakani et al.

(10) Patent No.: US 7,023,803 B2
(45) Date of Patent: Apr. 4, 2006

(54) APPARATUS, AND ASSOCIATED METHOD, FOR SELECTABLY CONTROLLING PACKET DATA FLOW IN A PACKET RADIO COMMUNICATION SYSTEM

(75) Inventors: Naveen K. Kakani, Denton, TX (US); Rene Purnadi, Coppell, TX (US); Yousuf Saifullah, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 675 days.

(21) Appl. No.: 09/966,897

(22) Filed: Sep. 28, 2001

(65) Prior Publication Data

US 2003/0063565 A1 Apr. 3, 2003

(51) Int. Cl.
*G01R 31/08* (2006.01)

(52) U.S. Cl. ...................... 370/235; 370/229

(58) Field of Classification Search ............. 370/229, 370/230, 235, 235.1, 236, 230.1, 231, 232, 370/233, 234
See application file for complete search history.

(56) References Cited

U.S. PATENT DOCUMENTS 5,708,655 A * 1/1998 Toth et al. ............ 370/313
6,307,867 B1 * 10/2001 Roobol et al. ........... 370/470
6,418,148 B1 7/2002 Kumar .................. 370/468
6,512,751 B1 1/2003 Struhsaker .............. 370/379
2002/0004379 A1 * 1/2002 Gruhl et al. ............. 455/403
2002/0041566 A1 * 4/2002 Yang et al. .............. 370/229
2003/0022654 A1 * 1/2003 Kakani et al. ........... 455/403

FOREIGN PATENT DOCUMENTS

| EP | 0 975 186 A2 | 1/2000 |
|---|---|---|
| WO | WO 99/622060 | 12/1999 |
| WO | PCT/IB02/03981 | 3/2003 |

* cited by examiner

*Primary Examiner*—Duc Ho
*Assistant Examiner*—Thien D. Tran
(74) *Attorney, Agent, or Firm*—Lackenbach Siegel, LLP

(57) ABSTRACT

Apparatus, and an associated method, for controlling a packet data flow in a radio communication system, such as a third-generation, cellular communication system. Indicia of communications of the packet data flow upon an air link extending to a mobile station are provided to a selector. The selector selects, responsive to values of the communication indicia, whether to alter, such as by reducing or terminating, the packet data flow upon the air link. Selection is made by the selector and indications of the selection are provided to an allocator. The allocator allocates communication capacity in the radio access network of the communication system to the packet data flow as well as other ongoing packet data flows in the radio access network.

5 Claims, 4 Drawing Sheets

APPARATUS, AND ASSOCIATED METHOD, FOR SELECTABLY CONTROLLING PACKET DATA FLOW IN A PACKET RADIO COMMUNICATION SYSTEM

The present invention relates generally to a manner by which selectably to facilitate packet data flows in a multi-user, packet radio communication system. More particularly, the present invention relates to apparatus, and an associated method, by which to control a packet data flow upon a communication link in the network infrastructure of the communication system. When communication conditions upon an air link used to communicate the packet of data of the packet data flow are poor, the flow of the packet data is terminated upon the communication link. The termination of the packet data flow upon the communication link permits the communication link to be utilized better to facilitate improved qualities and rates of flow of other packet data flows in the multi-user communication system.

BACKGROUND OF THE INVENTION

New types of communication systems have been constructed, implemented, and popularly-utilized as a result of advancements in communication technologies. In various of the new types of communication systems, the rate of data transmission and the corresponding amount of data permitted to be communicated through their use has increased relative to existing types of communication systems.

New types of radio communication systems are exemplary of communication systems that have been made possible as a result of advancements in communication technologies. Communication channels of a radio communication system are formed upon air, i.e., radio, links, thereby obviating the need for conventional wire line connections between sending and receiving stations operable in a radio communication system. Increased communication mobility, relative to a conventional wire line system, is provided, as a result, in a radio communication system. A cellular communication system is an exemplary type of radio communication system.

Amongst the advancements in communication technologies are advancements in digital communication techniques. Increasingly, communication systems utilize digital communication techniques in communication operations by which data is operated upon to facilitate its communication during operation of the communication system. The use of digital communication techniques, for instance, permits improvement in the bandwidth efficiency of communications in a communication system which utilizes the digital communication techniques. Because of the particular need in a cellular, or other radio, communication system to efficiently utilize the spectrum allocated thereto, the use of digital communication techniques is particularly advantageously implemented therein.

When digital communication techniques are used, information that is to be communicated is digitized. In one technique, the digitized information is formatted into packets, and the packets are communicated to effectuate the communication. Individual ones, or groups, of the packets of data can be communicated at discrete intervals. And, once communicated, the packets can be concatenated together to recreate the informational content contained therein.

Because packets of data can be communicated at the discrete intervals, a communication channel need not be dedicated solely for the communication of packet data generated by one sending station for communication to one receiving station, in contrast to conventional requirements of circuit-switched communications. Instead, a single channel can be shared amongst a plurality of different sending and receiving station-pairs. Packet data communications are effectuated in both conventional wire line communication systems, such as in conventional LANs (local area networks) as well as in radio communication systems.

Various constructions of cellular communication systems provide for packet data communications. And, various cellular communication system standards have been promulgated in which operational standards related to packet data communications are set forth for the cellular communication systems constructed according to such standards.

A cellular communication system is implemented throughout a geographic area by positioning a plurality of fixed-site, base transceiver stations throughout an area in which the communication system is to be installed. Each of the base stations defines a coverage area, referred to as a cell, within which radio communications with a mobile station are possible.

The base stations are controlled by cell gateways (CGWs), and the cell gateways are connected to a base station gateway (BSGW). The base stations, cell gateways, and base station gateways are collectively referred to as the network portion, network infrastructure, or radio access network (RAN) of the communication system. A mobile station is used to communicate, by way of an air link, with a selected base station. Because a cellular communication system is a multi-user communication system, a plurality of concurrent communication sessions in which packet data flows are communicated with more than one mobile station regularly occur.

The air links upon which packet data flows are communicated to effectuate communication with mobile stations are susceptible to various environmental, and other, conditions. Distortion of values of portions of data packets of the packet data flow during their transmission upon the air link might prevent their successful delivery to the mobile station. Retransmission of the adversely-affected data packets is sometimes, therefore, required. When excessive amounts of retransmissions are necessary, congestion conditions result. Too many data packets become "backed up" awaiting successful communication and then must be discarded. In a congestion condition, the packet data flow is unable successfully to be effectuated.

Routing of data packets of the packet data flow through the radio access networks consumes communication resources—both processing capacity of the network and communication bandwidth capacity. If the data packets are merely going to be discarded due to poor communication conditions on the air link, routing of the packet data flow through the radio access network ends without successful effectuation of communication with the mobile station, and the communication resources of the radio access networks are not efficiently utilized. The communication resources could better be utilized to facilitate communication of other packet data flows of other communication sessions.

A manner by which selectably to alter packet data flows in a radio access network of a radio communication system in the event that air link conditions are unacceptable would permit better utilization of the communication resources of the radio access network and thereby permit improved communication system operation.

It is in light of this background information related to packet radio communication systems that the significant improvements of the present invention have evolved.

SUMMARY OF THE INVENTION

The present invention, accordingly, advantageously provides apparatus, and an associated method, by which selectably to facilitate packet data flows in a multi-user, packet radio communication system.

Through operation of an embodiment of the present invention, a manner is provided by which to control a packet data flow upon a communication link in the radio access network of the radio communication system. When communication conditions upon an air link used to communicate the packet of data of the packet data flow are poor, the flow of the packet data is altered, e.g., terminated, upon the communication link. Thereafter, the communication resources within the radio access network are reallocated to facilitate communication of other packet data flows pursuant to other communication sessions.

In one aspect of the present invention, a communication path is formed during operation of the packet radio communication system by which to communicate packet data with a mobile station. The communication system includes a radio access network (RAN) portion through which a portion of the communication path is formed. The communication path further extends upon an air link with a mobile station. The radio access network part includes functional elements forming a network element and an interface element. A communication link interconnects the network and interface elements. The communication path is also defined upon the communication link extending between such elements. The network element is positioned, relative to the interface element, close to a correspondent node, such as a data source, at which packet data to be communicated to the mobile station is originated. Once the communication path is formed, packet data flows are routed thereon between the correspondent node and the mobile station to effectuate a communication service.

Measurements are made of a communication indicia associated with communication of the packet data pursuant to the packet data flow. Responsive to the values of the communication indicia, subsequent packet data flow is selectably altered upon the communication link between the network and interface elements. For instance, if the value of the communication indicia indicates the communication conditions upon the air link to be sufficiently poor, subsequent communication of packet data pursuant to the packet data flow on the communication link is terminated. By reducing, or terminating, additional packet data flow upon the communication link when communication conditions upon the air link are poor, the communication link can be used pursuant to other packet data flows to facilitate communication quality levels and communication rates of other packet data flows, thereby better utilizing the communication resources of the radio access network.

In another aspect of the present invention, an allocator is operable responsive to selections made upon evaluation of the communication indicia of the communication of the packet data upon the air link. The allocator selectably reallocates the communication capacity upon the communication link for further packet data communications pursuant to the packet data flow. And, the allocator further selectably reallocates communication capacity upon the communication link for other packet data flows. In the event of poor air link conditions, the packet data flow that is adversely affected is reduced, or terminated, thereby permitting increased communication capacity for the effectuation of other packet data flows.

In another aspect of the present invention, packet data is communicated upon an air link pursuant to an ARQ acknowledgment scheme. In an ARQ scheme, a receiving station acknowledges receipt of data with an affirmative acknowledgment (ACK) of successful communication of the data or a negative acknowledgment (NACK) indicating unsuccessful completion of communication of the data. The communication indicia indicative of the communication conditions upon the air link is related to the number of ACK, or NACK, indications provided by the mobile station responsive to communication of packet data pursuant to the packet data flow. Responsive to the indications, selection is made as to whether to alter the packet data rate on the communication link extending between the network element and the interface element. Reallocation of the communication capacity of the communication link is further selectably made.

In another aspect of the present invention, packet data is buffered at a buffer of the interface element. The packet data is buffered thereat while awaiting an indication of its successful delivery to the mobile station pursuant to a packet data flow. The amount of packet data buffered at the buffer defines a queue length and the queue length of the data buffered at the buffer forms the communication indicia representative of communication conditions upon the air link. When the queue length exceeds a selected threshold, subsequent communication of packet data upon the communication link extending between the network and interface elements is selectably altered. If, for instance, the queue length is too great, the packet data flow is terminated for at least a selected time.

In another aspect of the present invention, a signal-to-noise ratio (SNR) of packet data communicated upon the air link is measured. Responsive to the measured SNR levels, selection is made whether to alter subsequent packet data flow upon the communication link extending between the network and interface elements.

In another aspect of the present invention, the number of data packets 'dropped' or otherwise known not to be successfully communicated with the mobile station is monitored. Responsive to the number of dropped data packets, selection is made whether to alter subsequent packet data flow. And, in another aspect, the number of retransmission attempts required to communicate a data packet, or group of data packets, is monitored. Responsive to the number of retransmission attempts, selection is made whether to alter subsequent packet data flow.

In one implementation, the radio communication system is operable generally pursuant to a CDMA2000 (Code-Division, Multiple-Access 2000) standard specification which provides for the communication of digital data using an ARQ acknowledgment scheme pursuant to 1xtreme operation. The communication system includes a radio access network at which a network element and an interface element are defined. The network and interface elements are connected by way of a communication link extending therebetween. To effectuate a communication service between a mobile station operable in the radio communication system and a correspondent node, such as a server forming a data source of packet data, a packet data flow is generated upon a communication path extending through the radio access network, and upon an air link extending to the mobile station. At the radio access network, the communication path extends through the network element, the communication link, and the interface element. Measurements are made of communication quality indicia upon the air link. When communication conditions are poor, communication of additional packet data pursuant to the packet data flow is reduced or terminated, thereby to permit communication resources in the radio access network to be reallocated for other packet data flows.

In these and other aspects, therefore, apparatus, and an associated method, is provided for a mobile communication system in which packet data is communicated. The packet data is communicated in at least a first packet data flow pursuant to at least a first communication session with at least a first mobile station by way of at least a first air link. The mobile communication system has a network portion to which at least a first data service is coupled. And, the network portion includes a network element and an interface element connected thereto by way of a communication link. Control of the at least the first packet data flow upon the communication link is selectably facilitated. A data packet flow selector is coupled to the network portion and receives an indication of communication of the packet data in the first packet data flow upon the first air link. The selector is operable responsive thereto for selecting whether to alter the first packet data flow upon the communication link.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
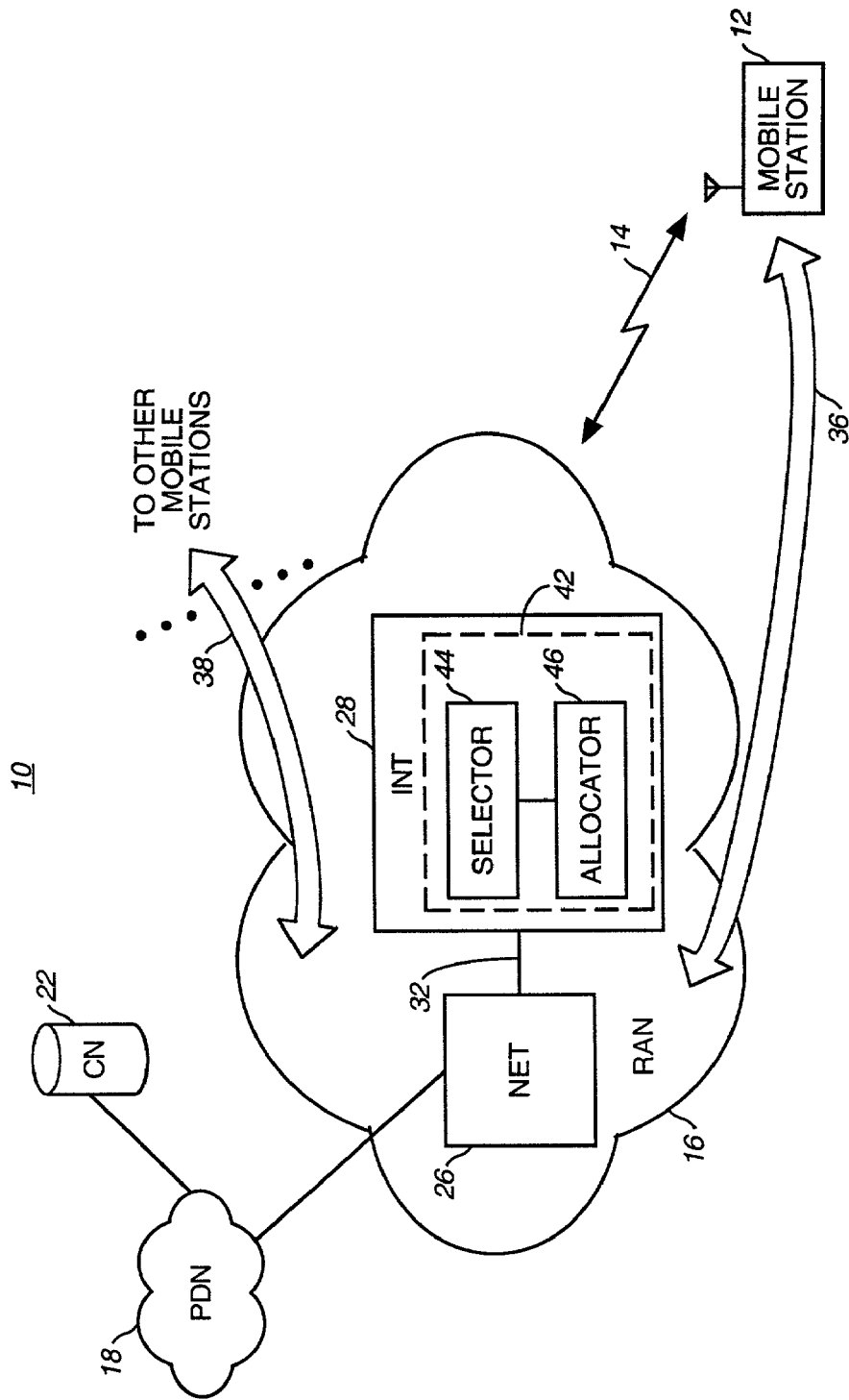
FIG. 1 illustrates a functional block diagram of an exemplary communication system in which an embodiment of the present invention is operable.

Turning first to FIG. 1, a communication system, shown generally at 10, provides for packet radio communications with a mobile station, such as the mobile station 12. The communication system 10 includes a radio part that, in the exemplary implementation shown in the figures, is operable generally pursuant to a CDMA2000 (Code-Division, Multiple-Access 2000) operational protocol. The implementation of the radio part of the communication system as a CDMA2000 system, however, is merely exemplary. And, while the following description of the exemplary implementation of an embodiment of the present invention shall be described with respect to an implementation in which the radio part of the communication system is operable pursuant to the CDMA2000 standard, the present invention is analogously operable in any of many packet radio communication systems. The system 10 is also representative, for instance, of a GSM system which provides for GPRS or EDGE packet communication services.

An air link 14 connects the mobile station with a radio access network (RAN) 16. The radio access network forms the network infrastructure of the radio part of the communication system.

The radio access network is connected to a packet data network (PDN) 18, such as the internet backbone. And, the packet data network is connected to a correspondent node (CN) 22. The correspondent node here forms a data source of packet data. The data source is formed of, for instance, a computer server at which packet-formattable data is stored or otherwise originated.

To communicate packet data between the correspondent node and the mobile station, a communication path is formed through the packet data network, the radio access network, and the air link. The radio access network includes a network element (NET) 26 and an interface element (INT) 28, and the portion of the communication path extends through the elements 26 and 28. A communication link 32 connects the network element and the interface element theretogether, and the communication link forms a portion of the communication path upon which packet data communicated between the correspondent node and the mobile station is routed.

The network element (NET) is positioned relatively closer to the data source formed of the correspondent node than is the interface element (INT). And, the interface element is positioned relatively more closely to the air interface 14 than is the network element.

Between the network element 26 and the mobile station 12, a packet data flow is defined, and here indicated by the segment 36. While not separately shown, the packet data flow extends between the mobile station and the data source, here formed of the correspondent node 22. The packet data flow extends along the communication path portion extending between the network element and the mobile station, and thereby extends along the communication link 32, through the interface element 28, and upon the air link 14. Because the communication system is a multi-user communication system, other packet data flows are generated concurrent with generation of the packet data flow represented by the segment 36. The other packet data flows to effectuate other communication sessions with other mobile stations are analogously representable. Here, the segment 38 is representative of another packet data flow.

The interface element 28 here further includes the apparatus 42 of an embodiment of the present invention. The apparatus includes elements that are functionally represented and can be implemented in any desired manner. In the exemplary implementation, the elements of the apparatus 42 are implemented as algorithms executable by suitable processing circuitry. And, while the apparatus 42 is positioned, in the exemplary implementation, at the interface element, in other implementations, the apparatus can be implemented elsewhere, or distributed throughout different locations of the radio access network, or even elsewhere, in the communication system.

The apparatus includes a selector 44 and an allocator 46 coupled thereto. The selector is coupled to receive input indicia. Input of the indicia to the selector is here represented by the arrow 48. The input indicia is of values representative of communication indicia of the packet data flow on the air link 14 pursuant to a communication session. The selector is operable responsive to the values of the input indicia to select whether to alter the packet data flow upon a communication path formed between the network element 16 and the mobile station. The communication path includes the communication link 32 extending between the network and interface elements 26 and 28 and the air link 14.

If the input indicia indicates the communication quality level of communications upon the air link 14 of the packet data flow to be sufficiently poor, selection is made to alter downwardly, or terminate completely, the packet data flow from the network element 26.

The allocator 46 is operable responsive to selection made by the selector to allocate communications upon the communication link 32. If the packet data flow represented by the arrow 36 is reduced in rate, or terminated, the allocator reallocates capacity on the communication link 32 for the effectuation of other packet data flows, such as the packet data flow represented by the arrow 38. Analogously, in another implementation, the allocator allocates communications upon the air link 14.

Figure 2:
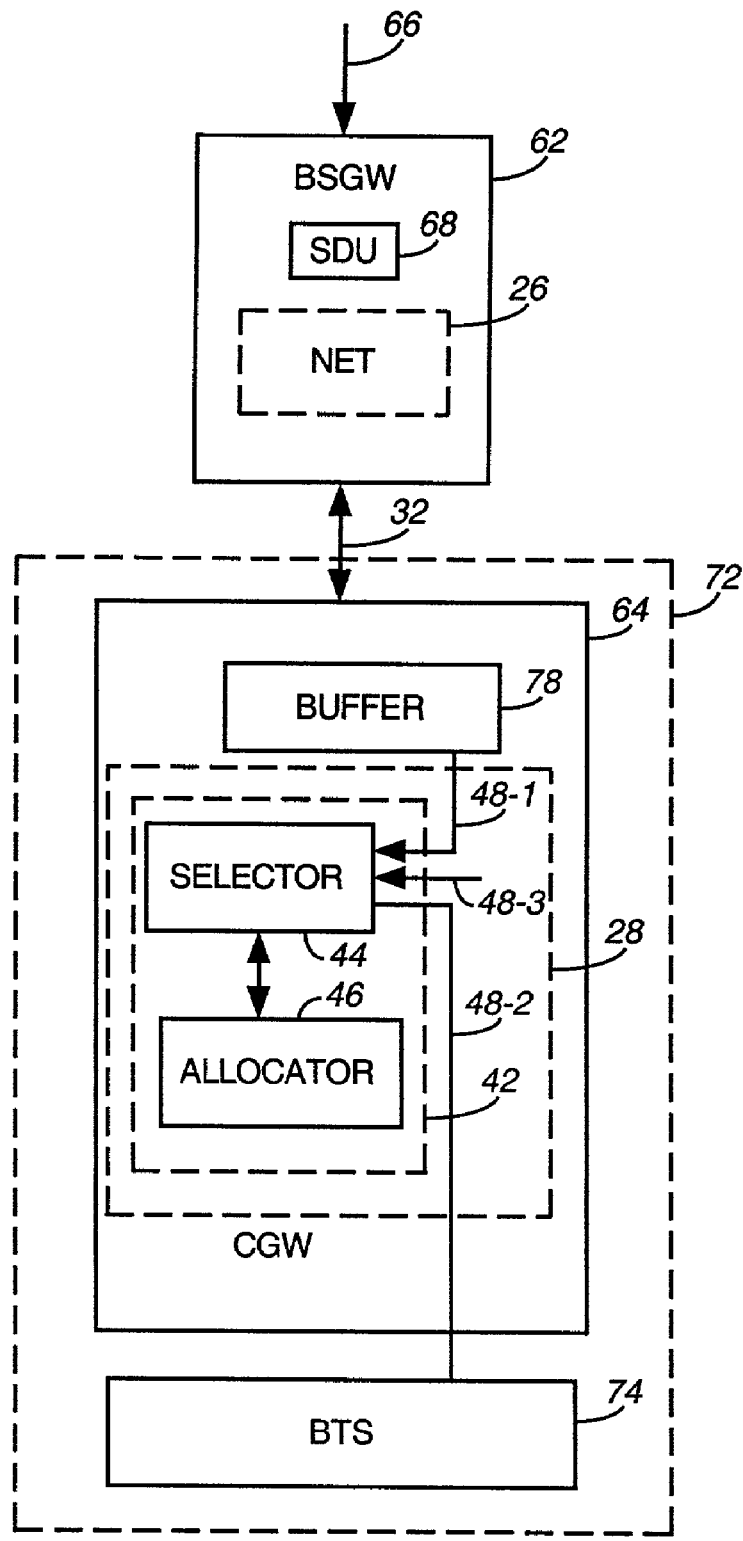
FIG. 2 illustrates a functional block diagram of a portion of the radio access network (RAN) part of the communication system shown in FIG. 1 and at which an embodiment of the present invention is implemented.

FIG. 2 illustrates portions of the radio access network 16 shown in FIG. 1. Namely, the network element 26 and the interface element 28 are again shown. The elements 26 and 28 are connected by way of the communication link 32. Here, the network element 26 is embodied at a base station gateway (BSGW) 62. And, the interface element 28 is embodied at a cell gateway (CGW) 64. Packet data, forming a packet data flow and originated at a data source, such as the correspondent node 22 (shown in FIG. 1) are provided to the base station gateway, here on the line 66.

The base station gateway is here shown also to include a segmentation and distribution unit (SDU) 68. The SDU is operable to perform segmentation and distribution operations including, for instance, formatting operations. While the SDU is illustrated to be separate from the network element, in one implementation, part, or all, of the functionality of the SDU is embodied at the network element.

The cell gateway 64 is coupled to a base transceiver station (BTS) 74. The interface element 28 located at the cell gateway includes a buffer 78. The buffer buffers data packets of the packet data flow during a communication session. Namely, data packets are buffered at the buffer pending successful delivery thereof to the mobile station (shown in FIG. 1).

In the exemplary implementation in which an ARQ acknowledgment scheme is utilized, data packets are buffered at the buffer 78 pending an ACK indication returned to the target entity that indicates successful delivery of the data packet thereto. When communication conditions on an air link interconnecting the radio access network with the mobile station are acceptable, the number of data packets buffered at the buffer 78 generally do not become overly extensive. If, however, communication conditions upon the air link are poor, extensive numbers of retransmission of data packets are required, and the queue length of data packets buffered at the buffer increases. The queue length at the buffer is thereby an indication of the communication conditions upon the air link. If the communication conditions upon the air link are sufficiently poor, the communication service intended to be effectuated pursuant to the packet data flow is inadequately performed.

Through operation of an embodiment of the present invention, when communication conditions are determined to be sufficiently poor to deleteriously affect the effectuation of the communication service, the packet data flow is reduced, or terminated, and the communication resources of the radio access network are reallocated to facilitate other packet data flows used pursuant to other communication sessions. A line 48-1, extending between the buffer 78 and the selector 44 of the apparatus 28, is representative of input of indicia representative of the queue length of the data packets buffered at the buffer 78.

In another implementation, signal-to-noise (SNR) ratios are utilized in the selections made by the selector 44. The line 48-2 extending from the base transceiver station 74 is representative of input of SNR indicia of packet data flow upon the air link during a communication session. The signal-to-noise ratio is, for instance, calculated at the mobile station and returned to the radio access network. The line 48-2 is also representative of input of indicia numbers of dropped packets or numbers of retransmissions of data packets. Other indicia, here indicated to be input to the selector by way of the line 48-3, is also selectably provided to the selector in this, or other, embodiments.

The selection criteria utilized by the selector is based upon any of many desired mechanisms, or combinations of mechanisms, i.e., input indicia associated with the air link conditions. Through operation of the apparatus 48, the network element 26 is made aware of air link conditions indicative of communication problems upon the air link during the communication session pursuant to which the packet data flow is attempted to be effectuated. Upon selection made by the selector, allocation by the allocator can instruct the network element to reduce, or terminate, subsequent communication of packet data pursuant to the packet data flow.

Generally, any of various parameters are input on the line, or lines, 48 extending to the selector. For instance, indications of a retransmission mechanism of retransmission of data packets upon the air interface is utilizable in selections made by the selectors. Some communication standards allow the flexibility of the system constructed pursuant to such standards to choose the number of retransmissions to be permitted upon the air interface. The parameter is selectably alterable from one flow to another flow and is sometimes not a constant parameter throughout an entire system. The queue length of the data buffered at the buffer is also utilizable alone, or in combination by the selector. And, the air link performance upon the air link is also utilizable both when the communication system utilizes a retransmission scheme, such as an ARQ scheme, or a communication scheme in which retransmissions are not utilized. In a system in which retransmissions are not utilized, an SNR value, or other indicia, is utilized by the selector.

For instance, in a communication session in which strict bandwidth requirements are needed and in which the communication conditions are determined, based upon values of communication indicia to be sufficiently poor, the packet data flow is reduced, or terminated, thereby to not drop data packets at the interface element. The data packets remain, or are dropped at, the network element. The other packet data flows to which additional communication capacity is reallocated is able to exhibit improved performance. Thereby, a link is provided between the air interface element and the network element by which to control the flow of a packet data flow over the communication link extending between such elements. The control is exerted as a function of the properties of the individual flows upon the air link to include the delay requirement, data rate requirement, retransmission mechanism, SNR of the flow, or other communication indicia.

Figure 3:
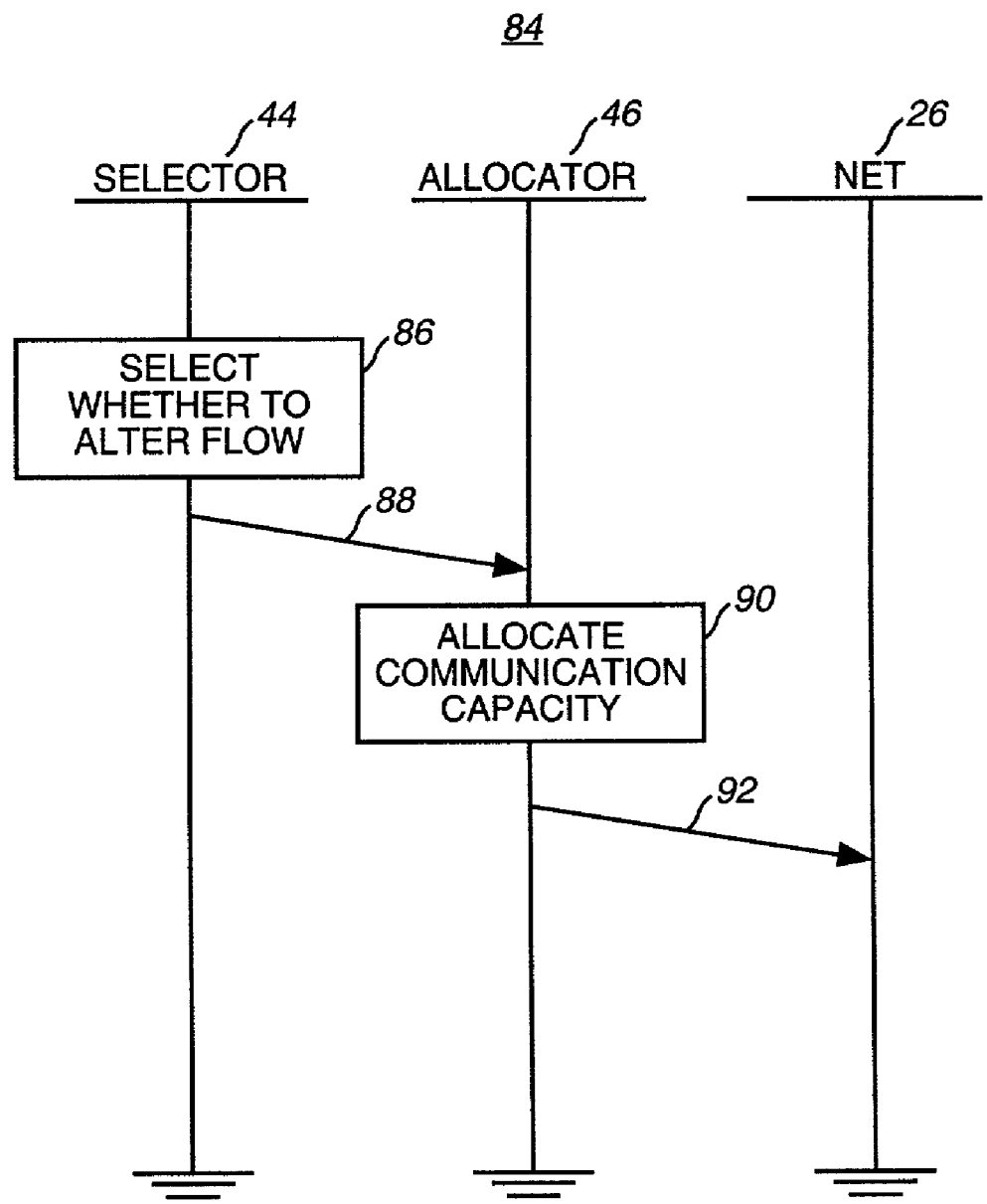
FIG. 3 illustrates a message sequence diagram illustrating the signaling generating during operation of an embodiment of the present invention.

FIG. 3 illustrates a message sequence diagram, shown generally at 84, representative of exemplary signaling generated during operation of the communication system 10 (shown in FIG. 1). First, and as indicated at the block 86, the selector selects whether to alter the packet data flow pursuant to a communication session. The selection is made responsive to communication indicia upon the air link that is provided to the selector. Indication of the selection made by the selector is provided, indicated by the segment 88, to the allocator 46. The allocator allocates, indicated by the block 90, communication capacity to the packet data flow, as well as other packet data flows pursuant to other communication sessions. An indication of the allocation is forwarded, indicated by the segment 92 to the network element 26. The network element effectuates the communication allocation and reallocates capacity, as appropriate.

Figure 4:
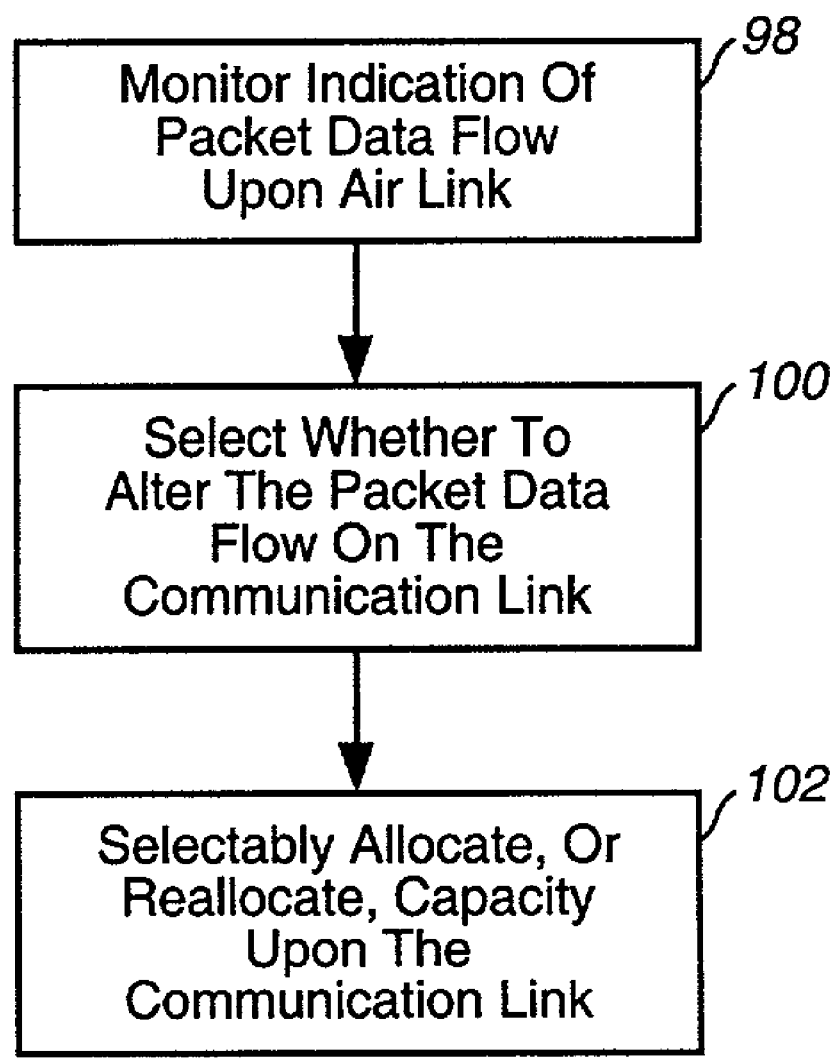
FIG. 4 illustrates a method flow diagram listing the method of operation of an embodiment of the present invention.

FIG. 4 illustrates a method, shown generally at 96, of an embodiment of the present invention. The method selectably facilitates control of at least a first packet data flow upon a communication link extending between a network element and an interface element of a network portion of the communication system.

First, and as indicated by the block 98, an indication of communication of the packet data in the first packet data flow upon a first air link extending to a mobile station is monitored. Then, and as indicated by the block 100, responsive to the monitored indication, selection is made whether to alter the first packet data flow upon the communication link.

Then, and as indicated by the block 102, communication capacity upon the communication link is selectably allocated, or reallocated, as appropriate.

Thereby, through operation of an embodiment of the present invention, a manner is provided by which to control packet data flow upon a communication link in a network infrastructure of a radio communication system, such as a CDMA2000 system, or other third generation (3G) cellular communication system.

The preferred descriptions are of preferred examples for implementing the invention, and the scope of the invention should not necessarily be limited by this description. The scope of the present invention is defined by the following claims.

The invention claimed is:

1. In a mobile communication system for communicating packet data in at least a first packet data flow pursuant to at least a first communication session with at least a first mobile station by way of at least a first air link, the mobile communication system having a network portion to which at least a first data service is coupled, and the network portion including a network element and an interface element connected thereto by way of a communication link, the packet data communicated between the network element and the first mobile station upon a communication path of which the communication link and the first air link form portions, an apparatus facilitating at least the first packet data flow upon the communication path, said apparatus comprising:

a data packet flow selector coupled to the network portion for receiving an indication of communication of the packet data in the first packet data flow upon the first air link, said selector operable responsive thereto for selecting whether to control the network element to directly alter the first packet data flow upon the communication path, and wherein packet data communicated in the first packet data flow by way of the first air link is communicated upon the first air link pursuant to an ARQ scheme in which the first mobile station returns an ACK (acknowledgment) when a data packet is successfully received at the first mobile station and a NACK (negative acknowledgment) when the data packet is unsuccessfully received at the first mobile station and wherein the indication, of the communication of the packet data in the first packet data flow, to which said packet data flow selector is coupled to receive, comprises a value inversely related to numbers of ACKs returned by the first mobile station.

2. The apparatus of claim 1 wherein the interface element comprises a buffer at which data packets are buffered at least for a selected time until an ACK is returned by the first mobile station indicating successful reception thereof at the first mobile station, the data packets buffered at the buffer forming a queue of a queue length corresponding to the data packets buffered at the buffer and wherein the indication, of the communication of the packet data in the first packet data flow, to which said packet data flow selector is coupled to receive further comprises a queue length indicia representative of the queue length at the buffer.

3. The apparatus of claim 2 wherein said data packet flow selector selects to terminate communication of the first packet data flow upon the communication path when the queue length indicia is beyond a selected threshold.

4. The apparatus of claim 3 wherein the indication of the communication of the packet data in the first packet data flow and of which said data packet flow selector is coupled to receive comprises a value representative of a signal-to-noise ratio of data packets communicated upon the first air link.

5. The apparatus of claim 4 wherein said data packet flow selector selects to terminate communication of the first packet data flow upon the communication link when the value representative of the signal-to-noise ratio is beneath a selected threshold.

* * * * *